United States Patent [19]
Oi et al.

[11] Patent Number: 5,804,102
[45] Date of Patent: Sep. 8, 1998

[54] PLASMA DISPLAY FILTER

[75] Inventors: Ryu Oi; Kazuhiro Seino; Yoriaki Matsuzaki, all of Yokohama; Yuko Mochizuki, Nagoya; Keisuke Takuma; Shin Fukuda, both of Yokohama; Yojiro Kumagae, Kawachinagano, all of Japan

[73] Assignees: Mitsui Chemicals, Inc., Tokyo; Yamamoto Chemicals, Inc., Osaka-fu, both of Japan

[21] Appl. No.: 768,327

[22] Filed: Dec. 17, 1996

[30] Foreign Application Priority Data

Dec. 22, 1995 [JP] Japan ..................... 7-334854
Jul. 12, 1996 [JP] Japan ..................... 8-183141

[51] Int. Cl.⁶ ............... F21V 9/04; G02B 5/22; H01J 7/24
[52] U.S. Cl. .............. 252/587; 359/350; 359/885; 315/111.21
[58] Field of Search ............. 252/587; 359/885, 359/350; 315/111.21

[56] References Cited

U.S. PATENT DOCUMENTS

| | | | |
|---|---|---|---|
| 4,767,571 | 8/1988 | Suzuki et al. . | |
| 4,976,503 | 12/1990 | Woodard | 359/885 |
| 5,024,923 | 6/1991 | Suzuki et al. . | |
| 5,124,067 | 6/1992 | Itoh et al. | 252/587 |
| 5,296,162 | 3/1994 | Itoh et al. . | |
| 5,446,141 | 8/1995 | Itoh et al. . | |
| 5,518,810 | 5/1996 | Nishihara et al. | 252/587 |
| 5,582,774 | 12/1996 | Itoh et al. | 252/587 |

FOREIGN PATENT DOCUMENTS

| | | |
|---|---|---|
| 0166370 | 1/1986 | European Pat. Off. . |
| 0373643 | 6/1990 | European Pat. Off. . |
| 9-145918 | 6/1997 | Japan . |

OTHER PUBLICATIONS

Patent Abstracts of Japan, vol. 015, No. 072 (C–0808), Feb. 20, 1991 & JP02296885 (Mitsui Toatsu Chemicals, Inc.), Dec. 1990 *Abtract Only*.

*Primary Examiner*—Philip Tucker
*Attorney, Agent, or Firm*—Burns, Doane, Swecker & Mathis, L.L.P.

[57] ABSTRACT

A plasma display filter for efficiently cutting off near infrared rays radiated from a plasma display so that malfunction of electronic equipment located around the display making use of near infrared light can be avoided. The filter contains in a base material at least one near infrared ray absorbing compound having a maximum absorption wavelength at 800 to 1,200 nm.

18 Claims, No Drawings

PLASMA DISPLAY FILTER

BACKGROUND OF THE INVENTION

1. Field of the Invention

This invention relates to a filter for cutting off near infrared radiation (800 to 1,000 nm) from a plasma display so that malfunction of an electronic equipment located around the display can be avoided.

More specifically, this invention is concerned with a display filter which contains in a base material at least one near infrared ray absorbing compound having a maximum absorption wavelength at 800 to 1,200 nm and which has a high visible light transmittance and a high cut-off efficiency for near infrared rays.

2. Description of the Related Art

For use in large-screen small-thickness television sets and small-thickness displays, plasma displays are attracting increasing interest in recent years and some products are already available on the market. However, the present inventors have been found that near infrared rays which are radiated from a plasma display affect electronic equipment located around the plasma display, such as a cordless telephone or a video deck making use of a near infrared light remote controller, and cause malfunctions. It is known to fabricate near infrared ray absorbing filters by using a near infrared ray absorbing pigment, but absolutely no specific measures are known for the prevention of malfunction by such displays.

SUMMARY OF THE INVENTION

One object of the present invention is to provide a practical filter which cuts off light in a near infrared range radiated from a display and causing malfunction of an electronic equipment located around the display, i.e., light in a range of from 800 to 900 nm, more preferably from 800 to 1,000 nm and which has a high visible light transmittance so that the visibility of the display is not impaired.

The present inventors have proceeded with extensive research to achieve the above object. As a result, it has been found that such malfunction can be avoided by arranging on a screen of a plasma display a filter which contains in a base material at least one near infrared ray absorbing compound having a maximum absorption wavelength at 800 to 1,200 nm. It has also been found that use of a particular metal complex compound, phthalocyanine compound or naphthalocyanine compound as such a near infrared ray absorbing compound makes it possible to provide a practical display filter which efficiently cuts off near infrared light as a cause for malfunction and moreover, which has a high visible light transmittance sufficient to avoid impairment on the visibility of the display. These findings have then led to the completion of the present invention. That is, the present invention relates to a plasma display filter which comprises a base material and at least one near infrared ray absorbing compound having a maximum absorption wavelength at 800 to 1,200 nm.

The filter according to the present invention contains the near infrared ray absorbing compound having the maximum absorption wavelength at 800 to 1,200 nm and efficiently cuts off near infrared rays radiated from a plasma display, so that it exhibits superb performance in avoiding or reducing malfunction of an electronic equipment located around the display.

DETAILED DESCRIPTION OF THE PREFERRED EMBODIMENTS

The plasma display filter according to the present invention contains in its base material at least one near infrared ray absorbing compound which has a maximum absorption wavelength at 800 to 1,200 nm. No particular limitation is imposed on the near infrared ray absorbing compound insofar as it does not adversely affect images to be shown on a display and can efficiently cut off near infrared rays as a cause for malfunction. However, particularly preferred examples of the compound include metal complex compounds represented by the following formula (1) or (2), phthalocyanine compounds represented by the following formula (3) and naphthalocyanine compounds represented by the following formula (4):

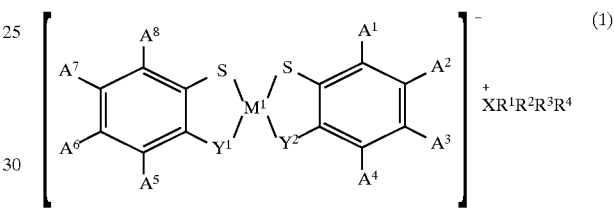

wherein $A^1$ to $A^8$ individually and independently represent a hydrogen or halogen atom or a nitro, cyano, thiocyanato, cyanato, acyl, carbamoyl, alkylaminocarbonyl, alkoxycarbonyl, aryloxycarbonyl, substituted or unsubstituted alkyl, substituted or unsubstituted aryl, substituted or unsubstituted alkoxy, substituted or unsubstituted aryloxy, substituted or unsubstituted alkylthio, substituted or unsubstituted arylthio, substituted or unsubstituted alkylamino, substituted or unsubstituted arylamino, substituted or unsubstituted alkylcarbonylamino, or substituted or unsubstituted arylcarbonylamino group, and adjacent two substituents may be coupled together via a connecting group, $Y^1$ and $Y^2$ individually represent an oxygen or sulfur atom, $R^1$ to $R^4$ individually and independently represent a substituted or unsubstituted alkyl or substituted or unsubstituted aryl group, $M^1$ represents nickel, platinum, palladium or copper, and X represents a nitrogen or phosphorus atom;

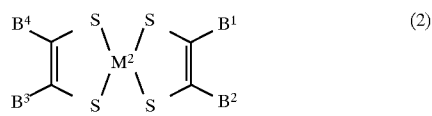

wherein $B^1$ to $B^4$ individually and independently represent a hydrogen atom or a cyano, acyl, carbamoyl, alkylaminocarbonyl, alkoxycarbonyl, aryloxycarbonyl, substituted or unsubstituted alkyl, or substituted or unsubstituted aryl, group, and adjacent two substituents may be coupled together via a connecting group, and $M^2$ represents nickel, platinum, palladium or copper;

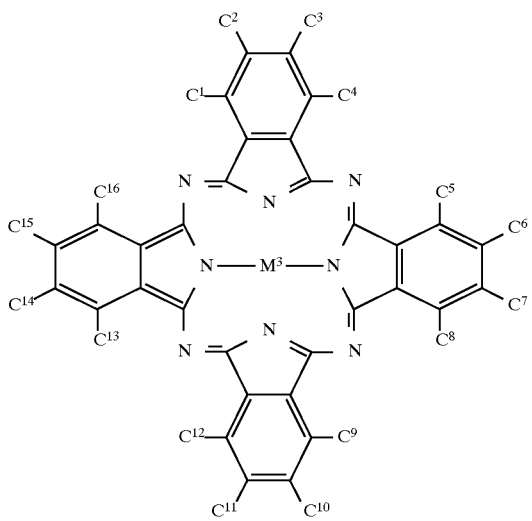

(3)

wherein $C^1$ to $C^{16}$ individually and independently represent a hydrogen or halogen atom, a hydroxyl, amino, hydroxysulfonyl or aminosulfonyl group, or a substituent which have 1 to 20 carbon atoms and may contain one or more nitrogen, sulfur, oxygen and/or halogen atoms, adjacent two substituents may be coupled together via a connecting group, and at least four of $C^1$ to $C^{16}$ are substituents which are each bonded via a sulfur atom and/or a nitrogen atom to a phthalocyanine nucleus, and $M^3$ represents two hydrogen atoms, a divalent metal atom, a substituted trivalent or tetravalent metal atom, or an oxymetal; and

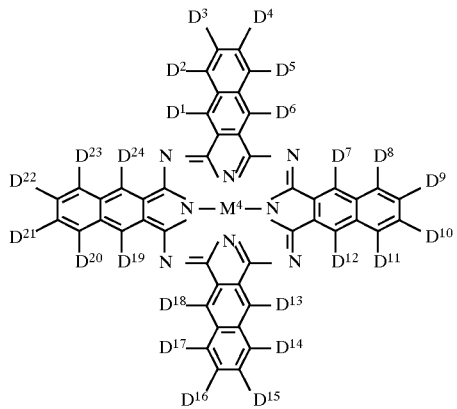

(4)

wherein $D^1$ to $D^{24}$ individually and independently represent a hydrogen or halogen atom, a hydroxyl, amino, hydroxysulfonyl or aminosulfonyl group, or a substituent which have 1 to 20 carbon atoms and may contain one or more nitrogen, sulfur, oxygen and/or halogen atoms, adjacent two substituents may be coupled together via a connecting group, and at least four of $D^1$ to $D^{24}$ are substituents which are each bonded via an oxygen atom and/or a sulfur atom and/or a nitrogen atom to a naphthalocyanine nuclear, and $M^4$ represents two hydrogen atoms, a divalent metal atom, a substituted trivalent or tetravalent metal atom, or an oxymetal.

Regarding the substituents represented by $A^1$ to $A^8$, $B^1$ to $B^4$ and $R^1$ to $R^4$ in the metal complex compounds represented by formulae (1) and (2) and useful in the practice of the present invention, a specific description will hereinafter be made.

Illustrative of the halogen atom are fluorine, chlorine, bromine and iodine atoms.

Examples of the substituted or unsubstituted alkyl group include linear, branched or cyclic hydrocarbon groups having 1 to 20 carbon atoms, such as methyl, ethyl, n-propyl, iso-propyl, n-butyl, iso-butyl, sec-butyl, t-butyl, n-pentyl, iso-pentyl, neo-pentyl, 1,2-dimethylpropyl, n-hexyl, cyclohexyl, 1,3-dimethylbutyl, 1-iso-propylpropyl, 1,2-dimethylbutyl, n-heptyl, 1,4-dimethylpentyl, 2-methyl-1-iso-propylpropyl, 1-ethyl-3-methylbutyl, n-octyl, 2-ethylhexyl, 3-methyl-1-iso-propylbutyl, 2-methyl-1-isopropyl, 1-t-butyl-2-methylpropyl, n-nonyl and 3,5,5-trimethylhexyl; alkoxyalkyl, alkoxyalkoxyalkyl or alkoxyalkoxyalkoxyalkyl groups such as methoxymethyl, methoxyethyl, ethoxyethyl, propoxyethyl, butoxyethyl, 3-methoxypropyl, 3-ethoxypropyl, methoxyethoxyethyl, ethoxyethoxyethyl, dimethoxymethyl, diethoxymethyl, dimethoxyethyl and diethoxyethyl; halogenated alkyl groups such as chloromethyl, 2,2,2-trichloroethyl, trifluoromethyl and 1,1,1,3,3,3-hexafluoro-2-propyl; and alkylaminoalkyl, dialkylaminoalkyl, alkoxycarbonylalkyl, alkylaminocarbonylalkyl and alkoxysulfonylalkyl groups, each of which has 2 to 20 carbon atoms.

Examples of the substituted or unsubstituted alkoxy group include linear, branched or cyclic alkoxy groups having 1 to 20 carbon atoms, such as methoxy, ethoxy, n-propoxy, iso-propoxy, n-butoxy, iso-butoxy, sec-butoxy, t-butoxy, n-pentyloxy, iso-pentyloxy, neo-pentyloxy, 1,2-dimethylpropoxy, n-hexyloxy, cyclohexyloxy, 1,3-dimethylbutoxy, 1-iso-propylpropoxy, 1,2-dimethylbutoxy, n-heptyloxy, 1,4-dimethylpentyloxy, 2-methyl-1-iso-propylpropoxy, 1-ethyl-3-methylbutoxy, n-octyloxy, 2-ethylhexyloxy, 3-methyl-1-iso-propylbutoxy, 2-methyl-1-iso-propoxy, 1-t-butyl-2-methylpropoxy, and n-nonyloxy; alkoxyalkoxy groups such as methoxymethoxy, methoxyethoxy, ethoxyethoxy, propoxyethoxy, butoxyethoxy, 3-methoxypropoxy, 3-ethoxypropoxy, dimethoxymethoxy, diethoxymethoxy, dimethoxyethoxy and diethoxyethoxy group; alkoxyalkoxyalkoxy or alkoxyalkoxyalkoxy groups such as methoxyethoxyethoxy, ethoxyethoxyethoxy and butoxyethoxyethoxy; halogenated alkoxy groups such as chloromethoxy, 2,2,2-trichloroethoxy, trifluoromethoxy and 1,1,1,3,3,3-hexafluoro-2-propoxy; and alkylaminoalkoxy and dialkylaminoalkoxy groups such as dimethylaminoethoxy and diethylaminoethoxy.

Examples of the substituted or unsubstituted aryl group include phenyl; halogenated phenyl groups such as chlorophenyl, dichlorophenyl, trichlorophenyl, bromophenyl, fluorophenyl, pentafluorophenyl and iodophenyl; alkyl-substitutedphenyl groups such as tolyl, xylyl, mesityl, ethylphenyl, dimethylethylphenyl, iso-propylphenyl, t-butylphenyl, t-butylmethylphenyl, octylphenyl and nonylphenyl; alkyl-derivative-substituted phenyl groups such as trifluoromethylphenyl; alkoxy-substituted phenyl groups such as methoxyphenyl, ethoxyphenyl, propoxyphenyl, hexyloxyphenyl, cyclohexyloxyphenyl, octyloxyphenyl, 2-ethylhexyloxyphenyl, 3,5,5-trimethylhexyloxyphenyl, methylethoxyphenyl, dimethoxyphenyl, 1-ethoxy-4-methoxyphenyl, chloromethoxyphenyl, ethoxyethoxyphenyl and ethoxyethoxyethoxyphenyl; alkylthio-substituted phenyl groups such as methylthiophenyl, ethylthiophenyl, t-butylthiophenyl, di-t-butylthiophenyl, 2-methyl-1-ethylthiophenyl and 2-butyl-1-methylthiophenyl; alkylaminophenyl groups such as N,N-dimethylaminophenyl, N,N-diethylaminophenyl, N,N-dipropylaminophenyl, N,N-dibutylaminophenyl, N,N-diamylaminophenyl, N,N-dihexylaminophenyl, N-methyl-N-ethylaminophenyl, N-butyl-N-ethylaminophenyl, N-hexyl-N- ethylaminophenyl, 4-(N,N-dimethylamino)-ethylphenyl, 4-(N,N-diethylamino)-methylphenyl, 3-(N,N-dimethylamino)-ethylphenyl and 2-(N,N-dimethylamino)-ethylphenyl; naphthyl group; halogenated naphthyl groups such as chloronaphthyl, dichloronaphthyl, trichloronaphthyl, bromonaphthyl, fluoronaphthyl, pentafluoronaphthyl and iodonaphthyl; alkyl-derivative-substituted naphthyl groups such as ethylnaphthyl, dimethylethylnaphthyl, iso-propylnaphthyl, t-butylnaphthyl, t-butylmethylnaphthyl, octylnaphthyl, nonylnaphthyl and trifluoromethylnaphthyl; alkoxy-substituted naphthyl groups such as methoxynaphthyl, ethoxynaphthyl, propoxynaphthyl, hexyloxynaphthyl, cyclohexyloxynaphthyl, octyloxynaphthyl, 2-ethylhexyloxynaphthyl, 3,5,5-trimethylhexyloxynaphthyl, methylethoxynaphthyl, dimethoxynaphthyl, chloromethoxynaphthyl, ethoxyethoxynaphthyl and ethoxyethoxyethoxynaphthyl; alkylthio-substituted naphthyl groups such as methylthionaphthyl, ethylthionaphthyl, t-butylthionaphthyl, methylethylthionaphthyl and butylmethylthionaphthyl; alkylaminonaphthyl groups such as N,N-dimethylaminonaphthyl, N,N-diethylaminonaphthyl, N,N-dipropylaminonaphthyl, N,N-dibutylaminonaphthyl, N,N-diamylaminonaphthyl, N,N-dihexylaminonaphthyl, N-methyl-N-ethylaminonaphthyl, N-butyl-N-ethylaminonaphthyl, N-hexyl-N-ethylaminonaphthyl, 4-(N,N-dimethylamino)-ethylnaphthyl, 4-(N,N-diethylamino)-methylnaphthyl, 3-(N,N-dimethylamino)-ethylnaphthyl and 2-(N,N-dimethylamino)-ethylnaphthyl; pyridyl, piperidyl, thiophenyl, imidazolyl, pyrrolidyl and furyl groups.

Illustrative of the substituted or unsubstituted aryloxy group are phenoxy, naphthoxy and alkylphenoxy groups.

Examples of the substituted or unsubstituted alkylthio group include linear, branched or cyclic alkylthio groups having 1 to 20 carbon atoms, such as methylthio, ethylthio, n-propylthio, iso-propylthio, n-butylthio, iso-butylthio, sec-butylthio, t-butylthio, n-pentylthio, iso-pentylthio, neo-pentylthio, 1,2-dimethylpropylthio, n-hexylthio, cyclohexylthio, 1,3-dimethylbutylthio, 1-iso-propylpropylthio, 1,2-dimethylbutylthio, n-heptylthio, 1,4-dimethylpentylthio, 2-methyl-1-iso-propylpropylthio, 1-ethyl-3-methylbutylthio, n-octylthio, 2-ethylhexylthio, 3-methyl-1-iso-propylbutylthio, 2-methyl-1-iso-propylthio, 1-t-butyl-2-methylpropylthio and n-nonylthio; alkoxyalkylthio, alkoxyalkoxyalkylthio or alkoxyalkoxyalkoxyalkylthio groups such as methoxymethylthio, methoxyethylthio, ethoxyethylthio, propoxyethylthio, butoxyethylthio, 3-methoxypropylthio, 3-ethoxypropylthio, methoxyethoxyethylthio, ethoxyethoxyethylthio, dimethoxymethylthio, diethoxymethylthio, dimethoxyethylthio and diethoxyethylthio; halogenated alkylthio groups such as chloromethylthio, 2,2,2-trichloroethylthio, trifluoromethylthio and 1,1,1,3,3,3-hexafluoro-2-propylthio; and alkylaminoalkylthio or dialkylaminoalkylthio groups such as dimethylaminoethylthio and diethylaminoethylthio.

Illustrative of the arylthio groups are phenylthio, naphthylthio and alkylphenylthio groups.

Examples of the substituted or unsubstituted alkoxycarbonyl group include linear, branched or cyclic alkoxycarbonyl groups having 2 to 20 carbon atoms, such as methoxycarbonyl, ethoxycarbonyl, n-propoxycarbonyl, isopropoxycarbonyl, n-butoxycarbonyl, iso-butoxycarbonyl, sec-butoxycarbonyl, t-butoxycarbonyl, n-pentyloxycarbonyl, iso-pentyloxycarbonyl, neo-pentyloxycarbonyl, 1,2-dimethylpropoxycarbonyl, n-hexyloxycarbonyl, cyclohexyloxycarbonyl, 1,3-dimethylbutoxycarbonyl, 1-iso-propylpropoxycarbonyl, 1,2-dimethylbutoxycarbonyl, n-heptyloxycarbonyl, 1,4-dimethylpentyloxycarbonyl, 2-methyl-1-iso-propylpropoxycarbonyl, 1-ethyl-3-methylbutoxycarbonyl, n-octyloxycarbonyl, 2-ethylhexyloxycarbonyl, 3-methyl-1-iso-propylbutoxycarbonyl, 2-methyl-1-iso-propoxycarbonyl, 1-t-butyl-2-methylpropoxycarbonyl, and n-nonyloxycarbonyl; alkoxyalkoxycarbonyl, alkoxyalkoxyalkoxycarbonyl or alkoxyalkoxyalkoxyalkoxycarbonyl groups such as methoxymethoxycarbonyl, methoxyethoxycarbonyl, ethoxyethoxycarbonyl, propoxyethoxycarbonyl, butoxyethoxycarbonyl, γ-methoxypropoxycarbonyl, γ-ethoxypropoxycarbonyl, methoxyethoxyethoxycarbonyl, ethoxyethoxyethoxycarbonyl, dimethoxymethoxycarbonyl, diethoxymethoxycarbonyl, dimethoxyethoxycarbonyl and diethoxyethoxycarbonyl; halogenated alkoxycarbonyl groups such as chloromethoxycarbonyl, 2,2,2-trichloroethoxycarbonyl, trifluoromethoxycarbonyl and 1,1,1,3,3,3-hexafluoro-2-propoxycarbonyl: and alkylaminoalkoxycarbonyl groups, dialkylaminoalkoxycarbonyl groups, alkylaminocarbonylalkoxycarbonyl groups, alkoxysulfonylalkoxycarbonyl groups and alkylsulfonyloxycarbonyl groups, each of which has 3 to 20 carbon atoms.

Illustrative of the aryloxycarbonyl group are phenyloxycarbonyl, naphthyloxycarbonyl, tolyloxycarbonyl, xylyloxycarbonyl and chlorophenyloxycarbonyl groups.

Examples of substituted or unsubstituted alkylamino group or substituted or unsubstituted arylamino group include alkylamino groups such as methylamino, ethylamino, n-propylamino, n-butylamino, sec-butylamino, n-pentylamino, n-hexylamino, n-heptylamino, n-octylamino, 2-ethylhexylamino, dimethylamino, diethylamino, di-n-propylamino, di-n-butylamino, di-sec-butylamino, di-n-pentylamino, di-n-hexylamino, di-n-heptylamino and di-n-octylamino; arylamino groups such as phenylamino, p-methylphenylamino, p-t-butylphenylamino, diphenylamino, di-p-methylphenylamino and di-p-t-butylphenylamino; alkylcarbonylamino groups such as acetylamino, ethylcarbonylamino, n-propylcarbonylamino, iso-propylcarbonylamino, n-butylcarbonylamino, iso-butylcarbonylamino, sec-butylcarbonylamino, t-butylcarbonylamino, n-pentylcarbonylamino, n-hexylcarbonylamino, cyclohexylcarbonylamino, n-heptylcarbonylamino, 3-heptylcarbonylamino and n-octylcarbonylamino; and arylcarbonylamino groups such as benzoylamino, p-chlorobenzoylamino, p-methoxybenzoylamino, p-t-butylbenzoylamino, p-trifluoromethylbenzoylamino, and m-trifluoromethylbenzoylamino.

Illustrative of the acyl group are acetyl, ethylcarbonyl, propylcarbonyl, butylcarbonyl, pentylcarbonyl, hexylcarbonyl, benzoyl and p-t-butylbenzoyl groups.

Illustrative of the alkylaminocarbonyl group are methylaminocarbonyl, ethylaminocarbonyl, n-propylaminocarbonyl, n-butylaminocarbonyl, sec-butylaminocarbonyl, n-pentylaminocarbonyl, n-hexylaminocarbonyl, n-heptylaminocarbonyl, n-octylaminocarbonyl, 2-ethylhexylaminocarbonyl, dimethylaminocarbonyl, diethylaminocarbonyl, di-n-propylaminocarbonyl, di-n-butylaminocarbonyl, di-sec-butylaminocarbonyl, di-n-pentylaminocarbonyl, di-n-hexylaminocarbonyl, di-n-heptylaminocarbonyl and di-n-octylaminocarbonyl groups.

Further, examples of the metals represented by $M^1$ and $M^2$ include nickel, platinum, palladium and copper, and X is a nitrogen atom or a phosphorus atom.

Most preferable examples of the substituents $A^1$ to $A^8$ of the metal complex compound represented by formula (1) are individually and independently a hydrogen atom, chlorine atom, bromine atom, an alkyl group having 1 to 5 carbon atoms such as methyl, ethyl, n-propyl, iso-propyl, n-butyl, iso-butyl, sec-butyl, t-butyl, n-pentyl, iso-pentyl or neo-pentyl. Further, most preferable examples of substituents represented by $R^1$ to $R^4$ are alkyl groups having 1 to 8 carbon atoms including methyl, ethyl, n-propyl, iso-propyl, n-butyl, iso-butyl, sec-butyl, t-butyl, n-pentyl, iso-pentyl, neo-pentyl, 1,2-dimethylpropyl, n-hexyl, cyclohexyl, 1,3-dimethylbutyl, 1-iso-propylpropyl, 1,2-dimethylbutyl, n-heptyl, 1,4-dimethylpentyl, 2-methyl-1-isopropylpropyl, 1-ethyl-3-methylbutyl, n-octyl and 2-ethylhexyl. Most preferable example of X is nitrogen atom and most preferable example of $M^1$ is nickel.

Most preferable examples of the substituents $B^1$ to $B^4$ of the metal complex compound represented by formula (2) are individually and independently substituted or unsubstituted phenyl or naphthyl groups having 6 to 20 carbon atoms such as phenyl, naphthyl, tolyl, xylyl, mesityl, ethylphenyl, dimethylethylphenyl, iso-propylphenyl, t-butylphenyl, t-butylmethylphenyl, methoxyphenyl, ethoxyphenyl, propoxyphenyl, N,N-dimethylaminophenyl, N,N-diethylaminophenyl, N,N-dipropylaminophenyl, N,N-dibutylaminophenyl, ethylnaphthyl, dimethylethylnaphthyl, iso-propylnaphthyl, t-butylnaphthyl, t-butylmethylnaphthyl, methoxynaphthyl, ethoxynaphthyl, propoxynaphthyl, methylthionaphthyl, ethylthionaphthyl, t-butylthionaphthyl, methylethylthionaphthyl, butylmethylthionaphthyl, N,N-dimethylaminonaphthyl, N,N-diethylaminonaphthyl, N,N-dipropylaminonaphthyl and N,N-dibutylaminonaphthyl and most preferable example of $M^2$ is nickel.

In the substituents represented by $C^1$ to $C^{16}$ in the phthalocyanine compound of formula (3) and $D^1$ to $D^{24}$ in naphthalocyanine compound of formula (4), respectively, at least four of $C^1$ to $C^{16}$ are substituents which are each bonded via a sulfur atom and/or a nitrogen atom to a phthalocyanine nucleus, and at least four of $D^1$ to $D^{24}$ are substituents which are each bonded via an oxygen atom and/or a sulfur atom and/or a nitrogen atom to a naphthalocyanine nucleus. Insofar as these requirements are met, no particular limitation is imposed on the remaining substituents. Nonetheless, these remaining substituents will hereinafter be described specifically.

Illustrative of the halogen atom are fluorine, chlorine, bromine and iodine atoms.

Examples of the substituent which have 1 to 20 carbon atoms and may contain one or more nitrogen, sulfur, oxygen and/or halogen atoms include linear, branched or cyclic alkyl groups such as methyl, ethyl, n-propyl, iso-propyl, n-butyl, iso-butyl, sec-butyl, t-butyl, n-pentyl, n-hexyl, cyclohexyl, n-heptyl, n-octyl and 2-ethylhexyl; alkyl groups containing one or more hetero atoms and/or aromatic rings, such as methoxymethyl, phenoxymethyl, diethylaminomethyl, phenylthiomethyl, benzyl, p-chlorobenzyl and p-methoxybenzyl; aryl groups such as phenyl, p-methoxyphenyl, p-t-butylphenyl and p-chlorophenyl; alkoxy groups or aryloxy groups, such as methoxy, ethoxy, n-propoxy, iso-propoxy, n-butoxy, iso-butoxy, sec-butoxy, t-butoxy, n-pentyloxy, n-hexyloxy, cyclohexyloxy, n-heptyloxy, n-octyloxy, 2-ethylhexyloxy, methoxyethoxy, phenoxyethoxy, hydroxyethoxy, benzyloxy, p-chlorobenzyloxy, p-methoxybenzyloxy, phenoxy, p-methoxyphenoxy, p-t-butylphenoxy, p-chlorophenoxy, o-aminophenoxy and p-diethylaminophenoxy; alkylcarbonyloxy groups such as acetyloxy, ethylcarbonyloxy, n-propylcarbonyloxy, iso-propylcarbonyloxy, n-butylcarbonyloxy, iso-butylcarbonyloxy, sec-butylcarbonyloxy, t-butylcarbonyloxy, n-pentylcarbonyloxy, n-hexylcarbonyloxy, cyclohexylcarbonyloxy, n-heptylcarbonyloxy, 3-heptylcarbonyloxy and n-octylcarbonyloxy, or arylcarbonyloxy groups such as benzoyloxy, p-chlorobenzoyloxy, p-methoxybenzoyloxy, p-t-butylbenzoyloxy, p-trifluoromethylbenzoyloxy, m-trifluoromethylbenzoyloxy, o-aminobenzoyloxy and p-diethylaminobenzoyloxy; alkylthio groups such as methylthio, ethylthio, n-propylthio, iso-propylthio, n-butylthio, iso-butylthio, sec-butylthio, t-butylthio, n-pentylthio, n-hexylthio, cyclohexylthio, n-heptylthio, n-octylthio, 2-ethylhexylthio, benzylthio, p-chlorobenzylthio and p-methoxybenzylthio, or arylthio, groups such as phenylthio, p-methoxyphenylthio, p-t-butylphenylthio, p-chlorophenylthio, o-aminophenylthio, o-(n-octylamino)phenylthio, o-(benzylamino)phenylthio, o-(methylamino)phenylthio, p-diethylaminophenylthio and naphthylthio; alkylamino groups, arylamino groups, alkylcarbonylamino groups or arylcarbonyl amino groups, such as methylamino, ethylamino, n-propylamino, n-butylamino, sec-butylamino, n-pentylamino, n-hexylamino, n-heptylamino, n-octylamino, 2-ethylhexylamino, dimethylamino, diethylamino, di-n-propylamino, di-n-butylamino, di-sec-butylamino, di-n-pentylamino, di-n-hexylamino, di-n-heptylamino, di-n-octylamino, phenylamino, p-methylphenylamino, p-t-butylphenylamino, diphenylamino, di-p-methylphenylamino, di-p-t-butylphenylamino, acetylamino, ethylcarbonylamino, n-propylcarbonylamino, iso-propylcarbonylamino, n-butylcarbonylamino, iso-butylcarbonylamino, sec-butylcarbonylamino, t-butylcarbonylamino, n-pentylcarbonylamino, n-hexylcarbonylamino, cyclohexylcarbonylamino, n-heptylcarbonylamino, 3-heptylcarbonylamino, n-octylcarbonylamino, benzoylamino, p-chlorobenzoylamino, p-methoxybenzoylamino, p-t-butylbenzoylamino, p-trifluoromethylbenzoylamino and m-trifluoromethylbenzoylamino; hydroxycarbonyl group; alkoxycarbonyl groups or aryloxycarbonyl groups, such as methoxycarbonyl, ethoxycarbonyl, n-propoxycarbonyl, isopropoxycarbonyl, n-butoxycarbonyl, iso-butoxycarbonyl, sec-butoxycarbonyl, t-butoxycarbonyl, n-pentyloxycarbonyl, n-hexyloxycarbonyl, cyclohexyloxycarbonyl, n-heptyloxycarbonyl, n-octyloxycarbonyl, 2-ethylhexyloxycarbonyl, methoxyethoxycarbonyl, phenoxyethoxycarbonyl, hydroxyethoxycarbonyl, benzyloxycarbonyl, phenoxycarbonyl, p-methoxyphenoxycarbonyl, p-t-butylphenoxycarbonyloxycarbonyl, p-chlorophenoxycarbonyl, o-aminophenoxycarbonyl and p-diethylaminophenoxycarbonyl; aminocarbonyl groups, alkylaminocarbonyl groups or arylaminocarbonyl groups, such as methylaminocarbonyl, ethylaminocarbonyl, n-propylaminocarbonyl, n-butylaminocarbonyl, sec-butylaminocarbonyl, n-pentylaminocarbonyl, n-hexylaminocarbonyl, n-heptylaminocarbonyl, n-octylaminocarbonyl, 2-ethylhexylaminocarbonyl, dimethylaminocarbonyl, diethylaminocarbonyl, di-n-propylaminocarbonyl, di-n-butylaminocarbonyl, di-sec-butylaminocarbonyl, di-n-pentylaminocarbonyl, di-n-hexylaminocarbonyl, di-n-heptylaminocarbonyl, di-n-octylaminocarbonyl, phenylaminocarbonyl, p-methylphenylaminocarbonyl, p-t-butylphenylaminocarbonyl, diphenylaminocarbonyl, di-p-methylphenylaminocarbonyl and di-p-t- butylphenylaminocarbonyl; and alkylaminosulfonyl groups or arylaminosulfonyl groups, such as methylaminosulfonyl, ethylaminosulfonyl, n-propylaminosulfonyl, n-butylaminosulfonyl, sec-butylaminosulfonyl, n-pentylaminosulfonyl, n-hexylaminosulfonyl, n-heptylaminosulfonyl, n-octylaminosulfonyl, 2-ethylhexylaminosulfonyl, dimethylaminosulfonyl, diethylaminosulfonyl, di-n-propylaminosulfonyl, di-n-butylaminosulfonyl, di-sec-butylaminosulfonyl, di-n-pentylaminosulfonyl, di-n-hexylaminosulfonyl, di-n-heptylaminosulfonyl, di-n-octylaminosulfonyl, phenylaminosulfonyl, p-methylphenylaminosulfonyl, p-t-butylphenylaminosulfonyl, diphenylaminosulfonyl, di-p-methylphenylaminosulfonyl and di-p-t-butylphenylaminosulfonyl.

Illustrative of the substituent in which adjacent two substituents may be coupled together via a connecting group are substituents each of which forms a 5- or 6-membered ring via hetero atoms as shown by the following formulae:

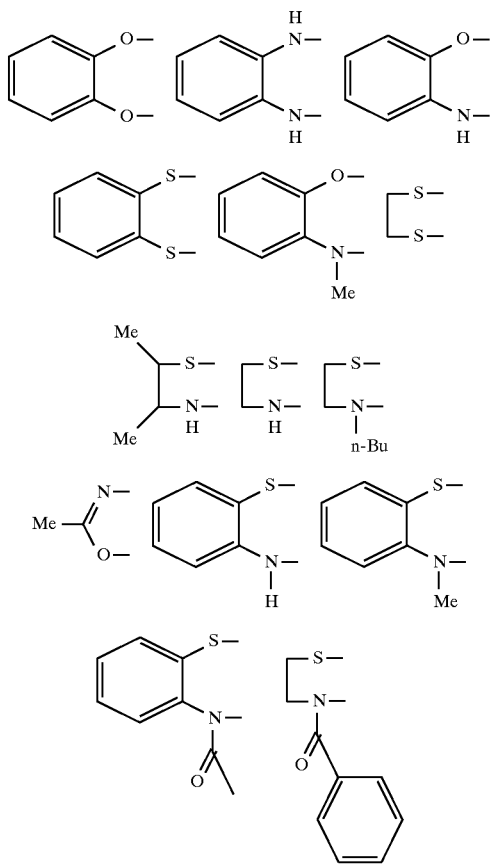

Illustrative of the substituents bonded via a sulfur atom and/or a nitrogen atom out of $C^1$ to $C^{16}$ are the above-described amino, aminosulfonyl, alkylthio, arylthio, alkylamino, arylamino, alkylcarbonylamino and arylcarbonylamino groups. The absorption wavelength of a phthalocyanine is generally 600 to 750 nm or so. Introduction of the substituent groups which are bonded via a sulfur atom and/or a nitrogen atom shifts the absorption wavelength to a longer side so that an absorption takes place at 800 nm or longer. To ensure this, at least four, more preferably at least eight of $C^1$ to $C^{16}$ are such substituents.

Illustrative of the substituents bonded via an oxygen atom and/or a sulfur atom and/or a nitrogen atom out of $D^1$ to $D^{24}$ are the above-described hydroxy, alkoxy, aryloxy, alkylcarbonyloxy, arylcarbonyloxy, amino, aminosulfonyl, alkylthio, arylthio, alkylamino, arylamino, alkylcarbonylamino and arylcarbonylamino groups. The absorption wavelength of a naphthalocyanine is generally 700 to 800 nm or so. Introduction of the substituent groups which are bonded via an oxygen atom and/or a sulfur atom and/or a nitrogen atom shifts the absorption wavelength to a longer side so that an absorption takes place at 800 nm or longer. To ensure this, at least four of $D^1$ to $D^{24}$ are such substituents.

Examples of the divalent metal represented by $M^3$ or $M^4$ include Cu(II), Zn(II), Fe(II), Co(II), Ni(II), Ru(II), Rh(II), Pd(II), Pt(II), Mn(II), Mg(II), Ti(II), Be(II), Ca(II), Ba(II), Cd(II), Hg(II), Pb(II), and Sn(II).

Examples of the monosubstituted trivalent metal include Al—Cl, Al—Br, Al—F, Al—I, Ga—Cl, Ga—F, Ga—I, Ga—Br, In—Cl, In—Br, In—I, In—F, Tl—Cl, Tl—Br, Tl—I, Tl—F, Al—C$_6$H$_5$, Al—C$_6$H$_4$(CH$_3$), In—C$_6$H$_5$, In—C$_6$H$_4$(CH$_3$), In—C$_6$H$_5$, Mn(OH), Mn(OC$_6$H$_5$), Mn[OSi(CH$_3$)$_3$], Fe—Cl, and Ru—Cl.

Examples of the di-substituted tetravalent metal include CrCl$_2$, SiCl$_2$, SiBr$_2$, SiF$_2$, SiI$_2$, ZrCl$_2$, GeCl$_2$, GeBr$_2$, GeI$_2$, GeF$_2$, SnCl$_2$, SnBr$_2$, SnF$_2$, TiCl$_2$, TiBr$_2$, TiF$_2$, Si(OH)$_2$, Ge(OH)$_2$, Zr(OH)$_2$, Mn(OH)$_2$, Sn(OH)$_2$, TiR$_2$, CrR$_2$, SiR$_2$, SnR$_2$, GeR$_2$ (wherein R is an alkyl, phenyl or naphthyl group, or a derivative thereof), Si(OR')$_2$, Sn(OR')$_2$, Ge(OR')$_2$, Ti(OR')$_2$, Cr(OR')$_2$ (wherein R' is an alkyl, phenyl, naphthyl, trialkylsilyl or dialkylalkoxysilyl group, or a derivative thereof), Sn(SR")$_2$ and Ge(SR")$_2$ (wherein R" is an alkyl, phenyl or naphthyl group, or a derivative thereof).

Illustrative of the oxymetal are VO, MnO and TiO.

Particularly preferred central metals out of these metals are Cu, Pd, AlCl, Tio and VO.

The plasma display filter according to the present invention contains at least one or more of the above-described near infrared ray absorbing compounds in a base material. The expression "contained in a base material" as used herein means a state in which the compound is coated on a surface of the base material, a state in which the compound is held between two layers of the base material, to say nothing of a state that the compound is contained inside the base material.

Illustrative of the base material are transparent resin plates, transparent resin films, and transparent glass sheets.

Although no particular limitation is imposed on the process for producing a display filter according to the present invention by using the above-described compound, the following four processes can be used:

(1) a process in which the near infrared ray absorbing compound is kneaded in a resin, followed by forming under heat into a resin plate or film, (2) a process in which a mixture of the near infrared ray absorbing compound and a resin monomer or a prepolymer thereof is cast and polymerized in the presence of a polymerization catalyst into a resin plate or film, (3) a process in which a coating formulation containing the near infrared ray absorbing compound is prepared and is then coated onto a transparent resin plate, a transparent resin film or transparent glass sheet, and (4) a process in which a two-piece resin sheet, a two-piece resin film, a two-piece glass sheet or the like is produced using an adhesive containing the near infrared ray absorbing compound.

First, in process (1) that the near infrared ray absorbing compound is kneaded in a resin and the resulting mixture is then formed under heat, the resin as a base material is preferably one capable of bringing about transparency as high as possible when formed into a resin plate or film. Specific examples can include polyethylene, vinyl resins and addition polymers, such as polystyrene, polyacrylic acid, polyacrylic esters, polyvinyl acetate, polyacrylonitrile, polyvinyl chloride, and polyvinyl fluoride; polymethacrylic acid, polymethacrylate, polyvinylidene chloride, polyvinylidene fluoride, and polyvinylidene cyanide; copolymers of vinyl compounds or fluorine-containing compounds such as vinylidene fluoride-trifluoroethylene copolymer, vinylidene fluoride-tetrafluoroethylene copolymer and vinylidene cyanide-vinyl acetate copolymer; fluorine-containing resins such as polytrifluoroethylene, polytetrafluoroethylene and polyhexafluoropropylene; polyamides such as nylon 6 and nylon 66; polyimides; polyurethanes; polypeptides; polyesters such as polyethylene terephthalate; polyethers such as polycarbonates, polyoxymethylene, polyethylene oxide, and polypropylene oxide; epoxy resins; polyvinyl alcohols; and polyvinyl butyral. It is however to be noted that the resin is not limited to these resins but resins capable of providing high surface hardness sufficient to substitute for glass, thermosetting resins such as thiourethane resins, and resins for optical use such as ARTON™ (product of Japan Synthetic Rubber Co., Ltd.), ZEONEX™ (product of Nippon Zeon Co., Ltd.), OPTOREZ™ (product of Hitachi Chemical Co., Ltd.) and O-PET™ (product of KANEBO, LTD.) can also be used.

Although the processing temperature, film-forming conditions and the like vary more or less depending on the base resin, illustrative production processes generally include:

(i) a process in which a near infrared ray absorbing compound is added to powder or pellets of a base resin, and the resulting mixture is heated and melted at 150° to 350° C. and is then formed into a resin sheet;

(ii) a process in which a film is formed by extruding said mixture; and (iii) a process in which a wound film is formed by extruding said mixture and is then uniaxially or biaxially stretched at twice to five times at 30° to 120° C. into a film of from 10 to 200 μm in thickness.

Upon kneading, additives commonly employed upon forming resins, such as an ultraviolet absorber and a plasticizer, may also be added. The amount of the near infrared ray absorbing compound to be added generally ranges from 1 ppm to 20% although it varies depending on the thickness of the resin plate or film to be produced, the desired absorbing capacity, the desired visible light transmittance and the like.

Next, in process (2) that the mixture of the near infrared ray absorbing compound and the resin monomer or the prepolymer of the resin monomer is cast and polymerized in the presence of the polymerization initiator into the resin plate or film, the mixture is molded by casting it into a mold and reacting and hardening the same or by pouring it into a mold and then allowing the same to become solid in the mold until a hard product is obtained. Many resins can be molded by this process. Usable resins include, for example, acrylic resins, diethylene glycol bis(allylcarbonate) resin, epoxy resins, phenol-formaldehyde resin, polystyrene resin, polysulfides, and silicone resins. It is however to be noted that the resin is not limited to these resins but resins capable of providing high surface hardness sufficient to substitute for glass can also be used. A casting process of methyl methacrylate by bulk polymerization is widely employed, which provided an acrylic sheet excellent in hardness, heat resistance and chemical resistance. Upon mixing, additives commonly employed upon molding resins, such as an ultraviolet absorber, a plasticizer and a mold releasing agent may also be added.

The amount of the near infrared ray absorbing compound to be added generally ranges from 1 ppm to 20% although it varies depending on the thickness of the resin plate or film to be produced, the desired absorbing capacity, the desired visible light transmittance and the like.

As the polymerization catalyst, a radical thermal polymerization initiator can be used. Usable examples include known peroxides such as benzoyl peroxide, p-chlorobenzoyl peroxide, diisopropyl peroxycarbonate, di-2-ethylhexyl peroxycarbonate, t-butyl peroxypivalate, t-butyl peroxy(2-ethylhexanoate); and known azo compounds such as azobisisobutyronitrile. It can be used generally in an amount of from 0.01 to 5 wt. % based on the total weight of the mixture. In the thermal polymerization, the heating temperature generally ranges from 40° to 200° C. or so, and the heating time usually ranges from 30 minutes to 8 hours or so. Besides thermal polymerization, it is also possible to use a photopolymerization process which requires addition of a photopolymerization initiator or sensitizer.

Examples of process (3) that the coating formulation is prepared and coated include a process in which the near infrared ray absorbing compound useful in the practice of the present invention is dissolved in a binder resin and an organic solvent to form a coating formulation, and a process in which the near infrared ray absorbing compound is ground into fine particles of several micrometers or smaller and is then dispersed in an acrylic emulsion to prepare a water-based coating formulation.

In the former process, an aliphatic ester resin, an acrylic resin, a melamine resin, a urethane resin, an aromatic ester resin, a polycarbonate resin, an aliphatic polyolefin resin, an aromatic polyolefin resin, a polyvinyl resin, a polyvinyl alcohol resin, a polyvinyl-modified resin (PVB, EVA or the like) or a copolymer resin thereof is used as the binder resin.

Further, resins for optical use such as ARTON™ (product of Japan Synthetic Rubber Co., Ltd.), ZEONEX™ (product of Nippon Zeon Co., Ltd.), OPTOREZ™ (product of Hitachi Chemical Co., Ltd.) and O-PET™ (product of KANEBO, LTD.) can also be used.

Usable examples of the solvent include halogenated solvents, alcohols, ketons, esters, aliphatic hydrocarbons, aromatic hydrocarbons, ethers, and mixture thereof.

The concentration of the near infrared ray absorbing compound is usually from 0.1 to 30% based on the weight of the binder resin, although it varies depending on the thickness of the coating, the desired absorbing capacity, the desired visible light transmittance and the like. On the other hand, the concentration of the binder resin generally ranges from 1 to 50% based on the whole coating formulation.

The acrylic-emulsion-type, water-based coating formulation can also be obtained likewise by dispersing the compound as fine particles (50 to 500 nm) in the uncolored acrylic-emulsion-type coating formulation. Additives commonly employed in coating formulations, such as an ultraviolet absorber and an antioxidant, may be added in the coating formulation.

The coating formulation prepared by the above-described process is applied onto a transparent resin film, a transparent resin plate, a transparent glass sheet or the like by a bar coater, blade coater, spin coater, reverse coater, die coater or sprayer, so that a display filter according to the present invention is fabricated.

To protect the coated surface, it is possible to apply a protective layer or to laminate a transparent resin plate, a transparent resin film or the like on the coated surface. Incidentally, cast film preparation is also classified into this process.

In process (4) in which the two-piece resin plate, two-piece resin film or two-piece glass sheet is produced using the adhesive containing the near infrared ray absorbing compound, a known transparent adhesive for resins such as silicone-based, urethane-based and acryl-based adhesives, or for glass such as polyvinylbutyral adhesives (PVB) and ethylene-vinyl acetate adhesives can be used as the adhesive.

Using the adhesive containing 0.1 to 30% of the near infrared ray absorbing compound, transparent resin plates, a transparent resin plate and a transparent resin film, a transparent resin plate and a glass sheet, transparent resin films, a transparent resin films and a glass sheet, or glass sheets are bonded together to fabricate a filter. As an alternative, thermocompression bonding can also be used. As another alternative, a film or plate produced by the above-described process can be bonded on a glass sheet, resin plate or the like as needed. The thickness of the filter generally ranges from 0.1 to 10 mm or so, although it varies depending on the specification of the plasma display to be manufactured. Furthermore, a transparent film containing a UV absorber (UV cut-off film) can be laminated on the outer side to enhance the light resistance of the filter.

Moreover, inclusion of an inorganic metal compound capable of absorbing or reflecting near infrared rays in addition to the near infrared ray absorbing compound makes it possible to fabricate a display filter which can efficiently cut off rays in a wavelength range around 1,000 nm and higher. No particular limitation is imposed on such an inorganic metal compound insofar as it can cut off rays in the wavelength range around 1,000 nm and higher without substantially impairing the transparency for rays in the visible range. Usable examples include metallic copper, copper compounds such as copper sulfide and copper oxide, metal mixtures containing zinc oxide as a principal component, tungsten compounds, $YbPO_4$, ITO (tin-doped indium oxide), and ATO (tin-doped antimony oxide). Such an inorganic metal compound is mixed together with the near infrared ray absorbing compound, and a display filter can then be fabricated by one of the above-described processes (1) to (4).

Absorption of rays in the visible range can be reduced by finely grinding the inorganic metal compound to a diameter of 1 micrometer or smaller, preferably 0.5 micrometer or smaller, more preferably 0.2 micrometer or smaller.

The amount of the inorganic metal compound to be added generally ranges from 1 to 90% based on the whole of the coating formulation or the formed resin product, although it varies depending on the thickness of the plate or film to be produced, the desired absorbing capacity, the desired visible light absorbency and the like. Also included in the present invention is a process that a sheet containing only a near infrared ray absorbing compound as a cut-off agent for rays in the near infrared range and a sheet containing only such an inorganic metal compound are produced separately and are then laminated together to fabricate a display filter.

A malfunction-preventing filter for a plasma display is arranged over the screen of the display so that near infrared rays radiated from the display can be cut off. If its transmittance for visible light is low, the vividness of a displayed image is reduced. Accordingly, the higher the transmittance of the filter for visible light, the better. The transmittance for visible light is required to be at least 40% or higher, preferably 50% or higher.

It is also designed that the cut-off range of near infrared rays, which are used by remote controllers and in transmission-system optical communication, is from 800 to 900 nm, preferably from 800 to 1,000 nm and the average light transmittance in this range becomes not higher than 50%, more preferably 30% or lower, still more preferably 20% or lower, notably 10% or lower. If necessary to achieve this, two or more near infrared ray absorbing compounds can be used in combination.

Further, to modify the color tone of the filter, one or more other colorants having absorption in the visible range can also be added to extents not impairing the advantageous effects of the present invention.

Moreover, a filter containing only color modifying colorant is prepared and then the filter is laminated on the display filter of the present invention. Particularly, when the electromagnetic wave cut-off layer is formed by sputtering, the color tone of the filter may be extremely changed compared with the original filter color. Therefore, it is important to modify the color tone of the filter.

To further improve the practical utility of the filter obtained by the above-described processes, the filter can be provided with an electromagnetic wave cut-off layer, an antireflection (AR) layer and an anti-glare (AG) layer. No particular limitation is imposed on the processes for the formation of these layers.

For the formation of the electromagnetic wave cut-off layer, sputtering or the like of a metal oxide or the like can be employed. Tin-doped $In_2O_3$ (ITO) is commonly employed. As an alternative, it is also possible to cut-off rays of 1,000 nm and higher ranging from near infrared rays and far infrared rays to electromagnetic by alternately depositing dielectric layers and metal layers on the filter by sputtering or the like. The dielectric layers are formed of a transparent metal oxide, such as indium oxide or zinc oxide, or the like, while silver is common for the metal layers. In general, sputtering is started to deposit a dielectric layer first and is continued until 3 layers, 5 layers, 7 layers, 9 layers or 11 layers are deposited. In this case, heat which is emitted from a plasma display can also be cut off.

As a base for the electromagnetic wave cut-off layer, the filter containing the near infrared rays absorbing compound can be employed as is. Alternatively, it is preferable that the electromagnetic wave cut-off layer is formed on a resin film or glass sheet by sputtering and then laminated on the filter containing the near infrared rays absorbing compound. When the electromagnetic wave is actually cut off, it is necessary to establish a ground electrode.

To reduce reflection on the surface of the filter and improve transmittance thereof, the antireflection layer can be formed of an inorganic substance such as metal oxides, fluorides, silicides, borides, carbides, nitrides or sulfides as a single layer or multiple layers by vacuum deposition, sputtering, ion plating, ion-beam-assisted sputtering or the like. Alternatively, the antireflection layer can be formed by laminating resins of different refractive indexes such as an acrylic resin and a fluorinated resin as a single layer or multiple layers. Moreover, a film conducted to an antireflection treatment can be laminated on the film. A hard coat layer can also be arranged if necessary. The anti-glare (AG) layer can be applied, if necessary for example, by formulating fine particles of silica, a melamine resin or an acrylic resin into an ink and coating the ink on the surface of the filter so that transmitted light can be scattered to broaden the angle of field of the filter. Hardening of the ink can be achieved by thermal hardening, photo hardening or the like. In the casting and polymerization process, a filter having the anti-glare layer can be fabricated in a single step by conducting its forming while using a glass cell which has been roughened at one side thereof by etching or the like.

The construction of the plasma display filter can be modified as needed. In general, however, an antireflection layer is arranged on the film containing a near infrared ray absorbing compound therein, if necessary, followed by the arrangement of an anti-glare layer on the opposite side of the antireflection layer. Further, if an electromagnetic wave cut-off layer is formed, the filter containing a near infrared ray absorbing compound is used as a base material and the electromagnetic wave cut-off layer is arranged thereon. As an alternative, a film having an electromagnetic wave cutting properties can be laminated on the filter containing a near infrared ray absorbing compound to produce a plasma display filter. In this case, antireflection layers can be further arranged on both sides of the filter. If necessary, an antireflection layer can be arranged on one side of the filter and an anti-glare layer can be arranged on the other side of the filter. If a colorant having absorbency in the visible region is added to modify the color tone of the filter, no particular limitation is imposed on the addition process.

As the plasma display filter according to the present invention has a high visible light transmittance, it can efficiently cut off near infrared rays (800 to 1,000 nm) radiated from the display without impairing the visibility of the display. Accordingly, the plasma display filter can prevent malfunction of electronic equipment located around the display without adversely affecting wavelengths employed by their remote controllers and in transmission-system optical communication and the like, and have excellent durability.

The present invention will hereinafter be described by the following examples. It should however be borne in mind that the present invention shall by no means be limited by the following examples.

EXAMPLE 1

A metal complex compound (1.5 g) represented by the below-described formula (5) and 10 kg of polymethyl methacrylate (PMMA) {"DELPET 80N", trade name; product of Asahi Chemicals Co., Ltd.} were melted and kneaded at 280° C., followed by the fabrication of a filter of 2 mm in thickness through an extruder. With respect to the filter, transmittance was measured by a spectrophotometer manufactured by ShimadzuCorporation, "UV-3100" (trade name). The visible light transmittance (Tv) was 83.5% (calculated following JIS-R-3106), and the average light transmittance in a range of from 800 to 900 nm was 4.1%.

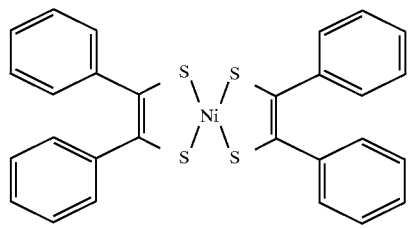

(5)

EXAMPLE 2

A filter was fabricated in exactly the same manner as in Example 1 except that 5.5 g of a metal complex compound represented by the below-described formula (6) were used in place of the metal complex compound of formula (5). With respect to this filter, transmittance was measured likewise.

The visible light transmittance (Tv) was 82.5% and the average light transmittance in a range of from 800 to 900 nm was 3.9%.

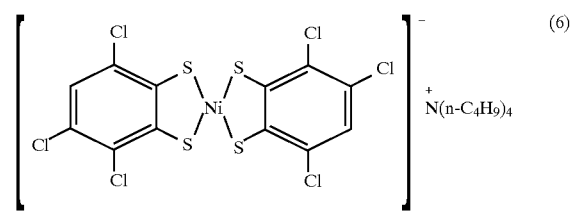

EXAMPLE 3

A filter was fabricated in a similar manner as in Example 1 except that a mixture of 1.0 g of compound (5) and 1.3 g of a metal complex compound represented by the below-described formula (7) was used in place of the metal complex compound of formula (5). With respect to this filter, transmittance was measured likewise. The visible light transmittance (Tv) was 69.5% and the average light transmittance in a range of from 800 to 1,000 nm was 2.7%.

The filter was applied on the screen of the plasma display, and an electronic equipment which permitted use of a remote controller was checked for malfunction at a position 3 meters apart from the display. The equipment malfunctioned when the filter was not applied, but no malfunction was observed when the filter was applied.

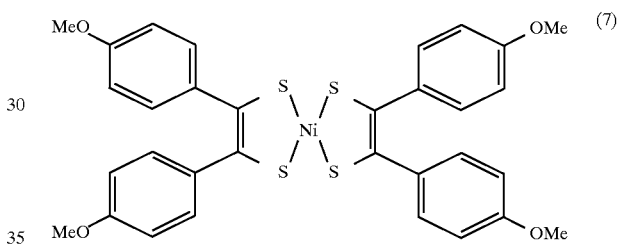

EXAMPLE 4

A filter was fabricated in a similar manner as in Example 1 except that a mixture of 1.8 g of compound (7) and 1.5 g of a metal complex compound represented by the below-described formula (8) was used in place of the metal complex compound of formula (5). With respect to this filter, transmittance was measured likewise. The visible light transmittance (Tv) was 63.4% and the average light transmittance in a range of from 800 to 1,000 nm was 1.7%.

As in Example 3, the filter was applied on the screen of the plasma display, and the electronic equipment which permitted use of the remote controller was checked for malfunction, but no malfunction was observed.

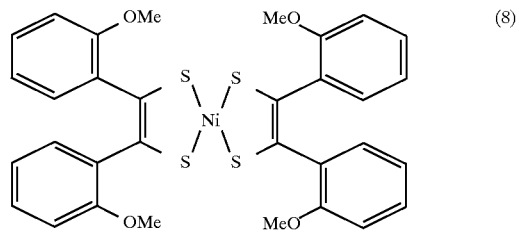

EXAMPLE 5

A filter was fabricated in a similar manner as in Example 1 except that a mixture of 1.5 g of compound (5) and 2.2 g of a metal complex compound represented by the below-described formula (9) was used in place of the metal complex compound of formula (5). With respect to this filter, transmittance was measured likewise. The visible light transmittance (Tv) was 54.9% and the average light transmittance in a range of from 800 to 1,000 nm was 1.5%.

As in Example 3, the filter was applied on the screen of the plasma display, and the electronic equipment which permitted use of the remote controller was checked for malfunction, but no malfunction was observed.

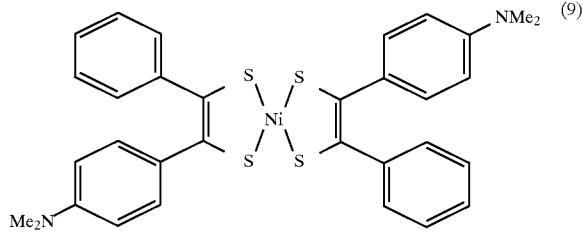

EXAMPLE 6

With 10 kg of polyethylene terephthalate pellets "1203" (product of Unichika, Ltd.), 80.0 g of compound (5) and 104.0 g of compound (7) were mixed. The resultant mixture was melted at 260° to 280° C. and then formed into a film of 100 μm in thickness through an extruder. The film was thereafter biaxially stretched into a film of 25 μm in thickness. With respect to this filter, transmittance was measured likewise. The visible light transmittance (Tv) was 68.7% and the average light transmittance in a range of from 800 to 1,000 nm was 2.9%.

EXAMPLE 7

Onto one side of the polyethylene terephthalate filter fabricated in Example 6, successively deposited were a thin indium oxide film by using indium as a target and an argon-oxygen mixed gas (overall pressure: 266 mPa, partial pressure of oxygen: 80 mPa) as a sputtering gas; a thin silver film by using silver as a target and argon gas (overall pressure: 266 mPa) as a sputtering gas; and a 40-nm thick indium oxide film, a 10-nm thick silver film, a 70-nm thick indium oxide film, a 10-nm thick silver film, a 70-nm thick indium oxide film, a 10-nm thick silver film, a 70-nm thick indium oxide film, a 10-nm thick silver film and a 30-nm thick indium oxide film in this order by magnetron DC sputtering, whereby an electromagnetic wave shielding layer was formed. Further, a silver paste (product of Mitsui Toatsu Chemicals, Inc.) was screen-printed on the thin-film-formed side of filter (472 mm×350 mm) and then dried to form conductive layer (metal electrodes) of 20 μm in thickness and 10 mm in width.

Further, a 2-mm thick PMMA plate having an anti-glare layer on one side thereof ("MR-NG", acryl filter, product of Mitsubishi Rayon Co., Ltd.) was laminated on the side where the anti-glare layer was not formed onto the side of the above-mentioned filter where the conductive layer was not formed, whereby a display filter having the anti-glare layer was fabricated.

As in Example 3, the filter was applied on the screen of the plasma display, and the electronic equipment which permitted use of the remote controller was checked for malfunction, but no malfunction was observed.

EXAMPLE 8

A film having 25 μm thick was produced as the same manner as in Example 6 except that 8 g of red dye ("PS Violet RC", trade name; product of Mitsui Toatsu Dye, Ltd.) were added in addition to the metal complex compound to modify the color tone. Onto the film, an electromagnetic wave cut-off layer and electrodes were formed as the same manner as in Example 7, followed by laminating on a reinforced glass sheet having 3 mm thick. Further, antireflection films ("Realook Film", trade name; product of Nippon Oil & Fats Co., Ltd.) were laminated on the both sides thereof to prepare a neutral color plasma display filter. As in Example 3, the filter was applied on the screen of the plasma display, and the electronic equipment which permitted use of the remote controller was checked for malfunction, but no malfunction was observed.

EXAMPLE 9

A phthalocyanine compound (3.0 g) represented by the below-described formula (10) and 10 kg of polymethyl methacrylate (PMMA) {"UDELPET 80N", trade name; product of Asahi Chemicals Co., Ltd.} were melted and kneaded at 280° C., followed by the fabrication of a filter of 3 mm in thickness through an extruder. With respect to the filter, transmittance was measured by a spectrophotometer manufactured by Shimadzu Corporation, "UV-3100" (tradename). The visible light transmittance (Tv) was 63.5% (calculated following JIS-R-3106), and the average light transmittance in a range of from 800 to 900 nm was 9.5%.

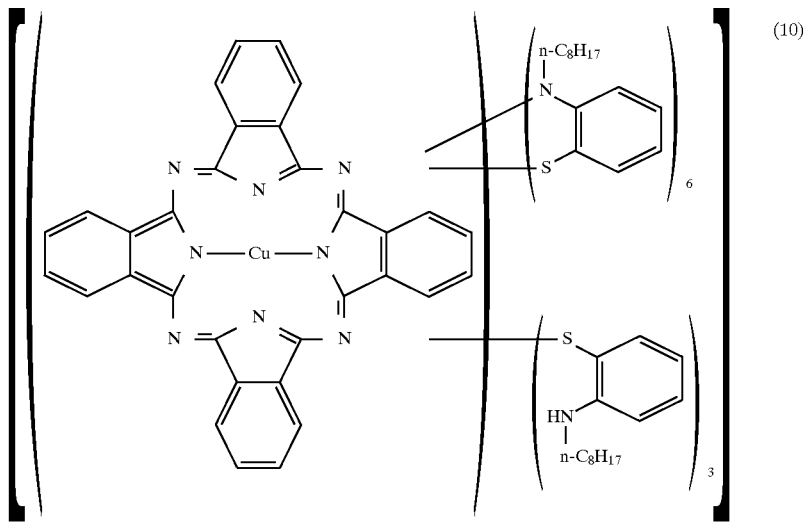

The filter was applied on the screen of the plasma display, and an electronic equipment which permitted use of a remote controller was checked for malfunction at a position 3 meters apart from the display. The equipment malfunctioned when the filter was not applied, but no malfunction was observed when the filter was applied.

Under the condition of 63° C., the filter was also subjected to a durability test by exposing it to light for 300 hours under a carbon arc lamp. The visible light transmittance (Tv) and the average light transmittance in the range of from 800 to 900 nm were measured. They were found to be 65.9% and 9.7%, respectively, so that practically no deterioration was observed on the filter. A malfunction test was also conducted in a similar manner. No malfunction was observed as in the case of the film before the durability test.

EXAMPLE 10

The phthalocyanine compound (0.3 g) employed in Example 9, 10 g of a polymerization catalyst ("PERBUTYL O", trade name; product of Nippon Oil & Fats Co., Ltd.) and 1 kg of methyl methacrylate were mixed. A filter of 3 mm in thickness was fabricated by cell casting method.

With respect to this filter, transmittance was measured likewise. The visible light transmittance (Tv) was 61.5%, and the average light transmittance in a range of from 800 to 900 nm was 8.9%.

As in Example 9, the filter was applied on the screen of the plasma display, and the electronic equipment which permitted use of the remote controller was checked for malfunction, but no malfunction was observed. Further, a durability test was also conducted in a similar manner as in Example 9. No deterioration was observed on the filter. After the test, no malfunction was observed.

EXAMPLE 11

A filter was fabricated in a similar manner as in Example 9 except that a mixture of 1.5 g of a compound of the below-described formula (11) and 1.5 g of a compound of the below-described formula (12) were used in place of the phthalocyanine compound of formula (10).

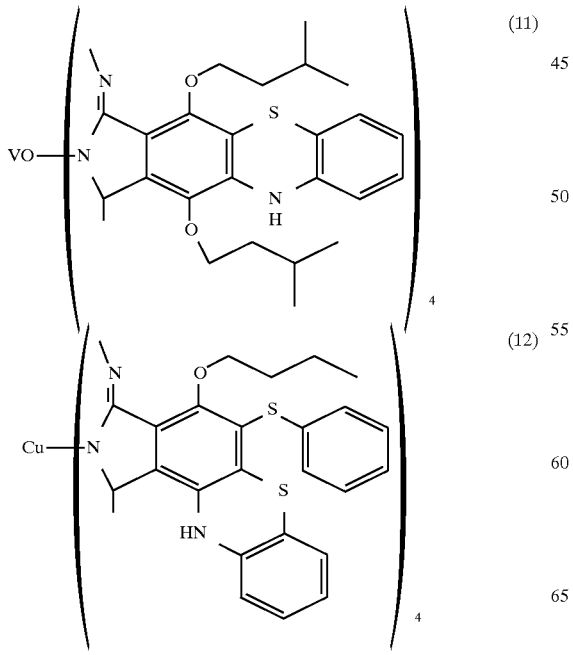

With respect to this filter, transmittance was measured likewise. The visible light transmittance (Tv) was 55.5%, and the average light transmittance in a range of from 800 to 1,000 nm was 9.7%.

As in Example 9, the filter was applied on the screen of the plasma display, and the electronic equipment which permitted use of the remote controller was checked for malfunction, but no malfunction was observed. Further, a durability test was also conducted in a similar manner as in Example 9. No deterioration was observed on the filter. After the test, no malfunction was observed.

EXAMPLE 12

A filter was fabricated in a similar manner as in Example 9 except that a mixture of 2.5 g of a compound (12) and 1.0 g of the metal complex compound (8) employed in Example 4 were used in place of the phthalocyanine compound (10).

With respect to this filter, transmittance was measured likewise. The visible light transmittance (Tv) was 61.4%, and the average light transmittance in a range of from 800 to 1,000 nm was 12.1%.

As in Example 9, the filter was applied on the screen of the plasma display, and the electronic equipment which permitted use of the remote controller was checked for malfunction, but no malfunction was observed. Further, a durability test was also conducted in a similar manner as in Example 9. No deterioration was observed on the filter. After the test, no malfunction was observed.

EXAMPLE 13

With 10 kg of polyethylene terephthalate pellets "1203" (product of Unichika, Ltd.), 150 g of compound (11) and 150 g of compound (12) were mixed. The resultant mixture was melted at 260° to 280° C. and then formed into a film of 100 μm in thickness through an extruder. The film was thereafter biaxially stretched into a film of 25 μm in thickness. With respect to this filter, transmittance was measured as in Example 9. The visible light transmittance (Tv) was 60.7%, and the average light transmittance in a range of from 800 to 1,000 nm was 16.5%.

As in Example 9, the filter was applied on the screen of the plasma display, and the electronic equipment which permitted use of the remote controller was checked for malfunction, but no malfunction was observed. Further, a durability test was also conducted in a similar manner as in Example 9. No deterioration was observed on the filter. After the test, no malfunction was observed.

EXAMPLES 14 to 25

Filters were fabricated in a similar manner as in Example 9 except that the corresponding near infrared ray absorbing compounds shown in Table 1 were used instead of phthalocyanine compound of formula (10).

With respect to these filters, the visible light transmittance (Tv), the average transmittance in the range of from 800 to 900 nm ($T_{800-900}$) and the average light transmittance in the range of from 800 to 1,000 nm ($T_{800-1000}$) were measured likewise. The results are also shown in Table 1.

TABLE 1

| Example No. | Near infrared ray absorbing compound | Tv (%) | $T_{800-900}$ (%) | $T_{800-1000}$ (%) |
| --- | --- | --- | --- | --- |
| 14 | | 68.1 | 9.3 | 21.5 |
| 15 | | 50.5 | 9.2 | 9.9 |
| 16 | | 65.4 | 9.2 | 19.3 |
| 17 | | 53.6 | 8.7 | 15.3 |
| 18 | | 65.4 | 8.0 | 17.2 |
| 19 | | 44.2 | 8.2 | 16.9 |

TABLE 1-continued

| Example No. | Near infrared ray absorbing compound | Tv (%) | $T_{800-900}$ (%) | $T_{800-1000}$ (%) |
| --- | --- | --- | --- | --- |
| 20 | (structure) | 60.1 | 9.5 | 12.5 |
| 21 | (structure) | 70.2 | 15.5 | 19.9 |
| 22 | (structure) | 65.7 | 10.0 | 15.8 |
| 23 | (structure) | 65.3 | 8.9 | 18.5 |

TABLE 1-continued

| Example No. | Near infrared ray absorbing compound | Tv (%) | $T_{800-900}$ (%) | $T_{800-1000}$ (%) |
|---|---|---|---|---|
| 24 | [VO complex structure with N, S-phenyl groups, subscript 4] | 58.3 | 8.0 | 10.9 |
| 25 | [Cu complex structure with N-butyl groups, subscript 4] | 59.3 | 8.3 | 9.8 |

As in Example 9, these filters were each applied on the screen of the plasma display, and the electronic equipment permitted use of the remote controller was checked for malfunction, but no malfunction was observed. Further, durability tests were also conducted in a similar manner as in Example 9. No deterioration was observed on each filter. After the tests, no malfunction was observed either.

EXAMPLE 26

A liquid (100 g), which had been obtained by mixing "Uban SE-60" (trade name, product of Mitsui Toatsu Chemicals, Inc.) and "Armatex 748-5M" (trade name, product of Mitsui Toatsu Chemicals, Inc.) at 3:7, was mixed with 2 g of phthalocyanine compound (10) used in Example 9 and 48 g of toluene. The resulting coating formulation was applied onto a polyethylene terephthalate film of 75 μm in thickness and was then dried at 130° C. for 15 minutes, whereby a filter was fabricated.

With respect to this filter, transmittance was measured likewise. The visible light transmittance (Tv) was 68.5%, and the average light transmittance in a range of from 800 to 1,000 nm was 14.8%.

As in Example 9, the filter was applied on the screen of the plasma display, and the electronic equipment which permitted use of the remote controller was checked for malfunction, but no malfunction was observed. Further, a durability test was also conducted in a similar manner as in Example 9. No deterioration was observed on the filter. After the test, no malfunction was observed.

EXAMPLE 27

A filter was fabricated in a similar manner as in Example 26 except that 30 g of ITO powder (average particle size: 0.04 μm) were added further.

With respect to this filter, transmittance was measured likewise. The visible light transmittance (Tv) was 50.5%, and the average light transmittance in a range of from 800 to 1,000 nm was 9.7%.

As in Example 9, the filter was applied on the screen of the plasma display, and the electronic equipment which permitted use of the remote controller was checked for malfunction, but no malfunction was observed. Further, a durability test was also conducted in a similar manner as in Example 9. No deterioration was observed on the filter. After the test, no malfunction was observed.

EXAMPLE 28

Three grams of phthalocyanine compound (10) used in Example 9 was dissolved at 180° C. in 1,000 g of polyvinylbutyral resin, and a colored film of 3 meters in width and 0.2 mm in thickness was the formed by a film-forming machine. Subsequently, the film was put between two sheets of float glass of 2 mm in thickness and was treated at 140° C. under 13 atm. for 20 minutes, whereby two-piece glass filter was fabricated. With respect to this two-piece glass filter, transmittance was measured likewise. The visible light transmittance (Tv) was 62.5%, and the average light transmittance in a range of from 800 to 1,000 nm was 15.7%.

As in Example 9, the filter was applied on the screen of the plasma display, and the electronic equipment which permitted use of the remote controller was checked for malfunction, but no malfunction was observed. Further, a durability test was also conducted in a similar manner as in Example 9. No deterioration was observed on the filter. After the test, no malfunction was observed.

EXAMPLE 29

Onto one side of the polyethylene terephthalate filter fabricated in Example 13, a 2-mm thick PMMA plate having an anti-glare layer ("MR-NG", acryl filter, product of Mitsubishi Rayon Co., Ltd.) was laminated on the side where the anti-glare layer was not formed, whereby a display filter having the anti-glare layer was fabricated.

EXAMPLE 30

Onto one side of the polyethylene terephthalate filter fabricated in Example 13, successively deposited were a thin indium oxide film by using indium as a target and an argon-oxygen mixed gas (overall pressure: 266 mPa, partial pressure of oxygen: 80 mPa) as a sputtering gas; a thin silver film by using silver as a target and argon gas (overall pressure: 266 mPa) as a sputtering gas; and a 40-nm thick indium oxide film, a 10-nm thick silver film, a 70-nm thick indium oxide film, a 10-nm thick silver film, a 70-nm thick indium oxide film, a 10-nm thick silver film, a 70-nm thick indium oxide film, a 10-nm thick silver film and a 30-nm thick indium oxide film in this order by magnetron DC sputtering, whereby an electromagnetic wave shielding layer was formed. Further, a silver paste (product of Mitsui Toatsu Chemicals, Inc.) was screen-printed on the thin-film-formed side of filter (472 mm×350 mm) and then dried to form conductive layer (metal electrodes) of 20 μm in thickness and 10 mm in width.

Further, a 2-mm thick PMMA plate having an anti-glare layer on one side thereof ("MR-NG", acryl filter, product of Mitsubishi Rayon Co., Ltd.) was laminated on the side where the anti-glare layer was formed onto the side of the above-mentioned filter where the conductive layer was not formed, whereby a display filter having the anti-glare layer was fabricated.

EXAMPLE 31

On one side of the polyethylene terephthalate filter fabricated in Example 13, a $ZrO_2/SiO_2$ mixture ($n_d=\lambda/2$), $ZrO_2$ ($n_d=\lambda/2$) and $SiO_2$ ($n_d=\lambda/4$) were successively coated in the form of multiple layers by vacuum deposition, whereby an antireflection layer was formed. On its opposite surface, a coating formulation prepared by dissolving 3 g of a thermosetting varnish ("SF-C-335", trade name; product of Dainippon Ink & Chemicals, Inc.) in 100 g of a 10:1 mixed solvent of toluene and methylethyl ketone was applied. After the solvent was allowed to naturally dry up, the varnish was cured at 150° C. for 20 seconds, whereby an anti-glare layer of 1 μm in thickness was formed.

EXAMPLE 32

A film having 25 μm thick was produced as the same manner as in Example 13 except that 8 g of red dye ("PS Violet RC", trade name; product of Mitsui Toatsu Dye, Ltd.) were added in addition to the metal complex compound to modify the color tone. Onto the film, an electromagnetic wave cut-off layer and electrodes were formed as the same manner as in Example 7, followed by laminating on a reinforced glass sheet having 3 mm thick. Further, antireflection films ("Realook Film", trade name; product of Nippon Oil & Fats Co., Ltd.) were laminated on the both sides thereof to prepare a neutral color plasma display filter.

EXAMPLE 33

A filter was fabricated in a similar manner as in Example 5 except that a metal complex compound of the below-described formula (13) was used in place of that of formula (9). With respect to the filter, transmittance was measured likewise. The visible light transmittance (Tv) was 60.5% and the average light transmittance in a range of from 800 to 1,000 nm was 1.9%.

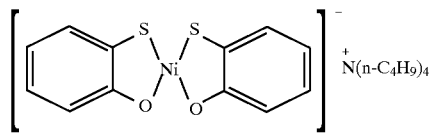

What is claimed is:

1. A plasma display and a plasma display filter comprising a base material and at least one near infrared ray absorbing compound having a maximum absorption wavelength at 800 nm to 1,200 nm.

2. A plasma display and a plasma display filter according to claim 1, wherein said near infrared ray absorbing compound is a compound selected from the group consisting of metal complex compounds represented by the following formula (1) or (2), phthalocyanine compounds represented by the following formula (3) and naphthalocyanine compound represented by the following formula (4):

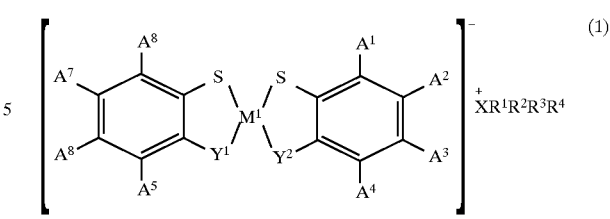

wherein $A^1$ to $A^8$ individually and independently represent a hydrogen or halogen atom or a nitro, cyano, thiocyanato, cyanato, acyl, carbamoyl, alkylaminocarbonyl, alkoxycarbonyl, aryloxycarbonyl, substituted or unsubstituted alkyl, substituted or unsubstituted aryl, substituted or unsubstituted alkoxy, substituted or unsubstituted aryloxy, substituted or unsubstituted alkylthio, substituted or unsubstituted arylthio, substituted or unsubstituted alkylamino, substituted or unsubstituted arylamino, substituted or unsubstituted alkylcarbonylamino, or substituted or unsubstituted arylcarbonylamino group, and adjacent two substituents may be coupled together via a connecting group, $Y^1$ and $Y^2$ individually represent an oxygen or sulfur atom, $R^1$ to $R^4$ individually and independently represent a substituted or unsubstituted alkyl or substituted or unsubstituted aryl group, $M^1$ represents nickel, platinum, palladium or copper, and X represents a nitrogen or phosphorus atom;

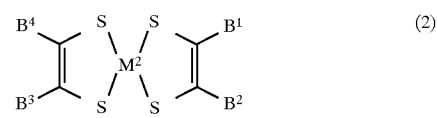

wherein $B^1$ to $B^4$ individually and independently represent a hydrogen atom or a cyano, acyl, carbamoyl, alkylaminocarbonyl, alkoxycarbonyl, aryloxycarbonyl, substituted or unsubstituted alkyl, or substituted or unsubstituted aryl, group, and adjacent two substituents may be coupled together via a connecting group, and $M^2$ represents nickel, platinum, palladium or copper;

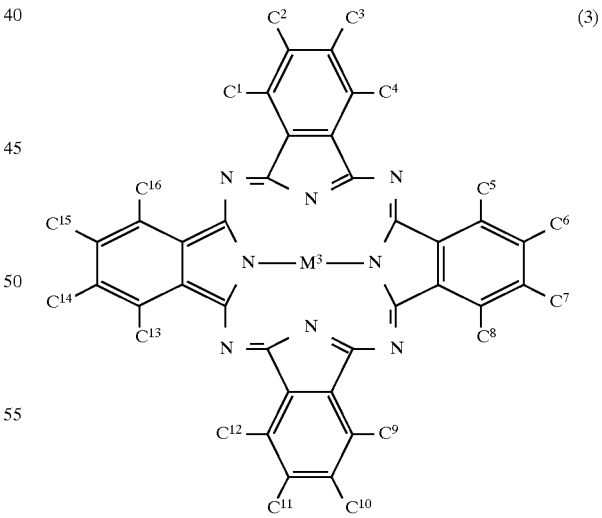

wherein $C^1$ to $C^{16}$ individually and independently represent a hydrogen or halogen atom, a hydroxyl, amino, hydroxysulfonyl or aminosulfonyl group, or a substituent which have 1 to 20 carbon atoms and may contain one or more nitrogen, sulfur, oxygen and/or halogen atoms, adjacent two substituents may be coupled together via a connecting group, and at least four of $C^1$ to $C^{16}$ are substituents which are each bonded via a sulfur atom and/or a nitrogen atom, and $M^3$ represents two hydrogen atoms, a divalent metal atom, a substituted trivalent or tetravalent metal atom, or an oxymetal; and

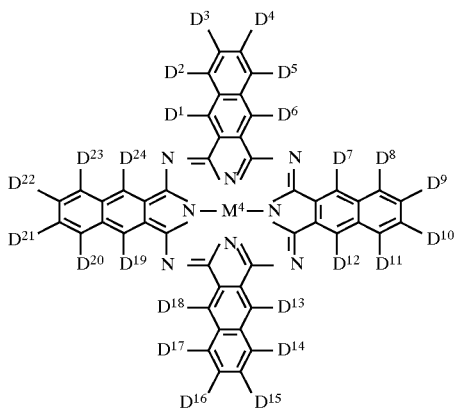

(4)

wherein $D^1$ to $D^{24}$ individually and independently represent a hydrogen or halogen atom, a hydroxyl, amino, hydroxysulfonyl or aminosulfonyl group, or a substituent which have 1 to 20 carbon atoms and may contain one or more nitrogen, sulfur, oxygen and/or halogen atoms, adjacent two substituents may be coupled together via a connecting group, and at least four of $D^1$ to $D^{24}$ are substituents which are each bonded via an oxygen atom and/or a sulfur atom and/or a nitrogen atom to a naphthalocyanine nuclear, and $M^4$ represents two hydrogen atoms, a divalent metal atom, a substituted trivalent or tetravalent metal atom, or an oxymetal.

3. A plasma display and a plasma display filter according to claim 2, wherein said filter has a visible light transmittance of 40% or higher.

4. A plasma display and a plasma display filter according to claim 3, wherein said filter has an average light transmittance of 50% or lower in a range of from 800 to 900 nm.

5. A plasma display and a plasma display filter according to claim 4, wherein said filter has an average light transmittance of 50% or lower in a range of from 800 to 1,000 nm.

6. A plasma display and a plasma display filter according to claim 2, further comprising an inorganic metal compound.

7. A plasma display and a plasma display filter according to claim 2, further comprising an electromagnetic wave cut-off layer applied thereon.

8. A plasma display and a plasma display filter according to claim 2, further comprising an antireflection layer applied thereon.

9. A plasma display and a plasma display filter according to claim 2, further comprising an anti-glare layer applied thereon.

10. A plasma display and a plasma display filter according to claim 1, wherein said filter has a visible light transmittance of 40% or higher.

11. A plasma display and a plasma display filter according to claim 10, wherein said filter has an average light transmittance of 50% or lower in a range of from 800 to 900 nm.

12. A plasma display and a plasma display filter according to claim 11, wherein said filter has an average light transmittance of 50% or lower in a range of from 800 to 1,000 nm.

13. A plasma display and a plasma display filter according to claim 1, further comprising an inorganic metal compound.

14. A plasma display and a plasma display filter according to claim 1, further comprising an electromagnetic wave cut-off layer applied thereon.

15. A plasma display and a plasma display filter according to claim 1, further comprising an antireflection layer applied thereon.

16. A plasma display and a plasma display filter according to claim 1, further comprising an anti-glare layer applied thereon.

17. A plasma display and a plasma display filter according to claim 1, wherein said filter has an average light transmittance of 20% or lower in a range of from 800–900 nm.

18. A plasma display and a plasma display filter according to claim 1, wherein said filter has an average light transmittance of 20% or lower in a range of from 800–1,000 nm.

* * * * *